United States Patent
Chen et al.

(10) Patent No.: US 10,437,369 B2
(45) Date of Patent: Oct. 8, 2019

(54) SOFTWARE DEFINED INPUT OPERATION SENSING SYSTEM

(71) Applicant: Rich IP Technology Inc., Taipei (TW)

(72) Inventors: Han-Chang Chen, Taipei (TW); Yen-Hung Tu, Taipei (TW); Chung-Lin Chia, Taipei (TW)

(73) Assignee: RICH IP TECHNOLOGY INC., Taipei (TW)

( * ) Notice: Subject to any disclaimer, the term of this patent is extended or adjusted under 35 U.S.C. 154(b) by 0 days.

(21) Appl. No.: 15/910,693

(22) Filed: Mar. 2, 2018

(65) Prior Publication Data
US 2018/0275805 A1     Sep. 27, 2018

(30) Foreign Application Priority Data
Mar. 24, 2017   (TW) ................................ 106109899

(51) Int. Cl.
*G06F 3/041*     (2006.01)
*G06F 3/0488*    (2013.01)
*G06F 3/044*     (2006.01)

(52) U.S. Cl.
CPC .......... *G06F 3/0412* (2013.01); *G06F 3/0414* (2013.01); *G06F 3/0416* (2013.01); *G06F 3/0488* (2013.01); *G06F 3/04883* (2013.01); *G06F 3/044* (2013.01); *G06F 2203/04104* (2013.01); *G06F 2203/04106* (2013.01)

(58) Field of Classification Search
CPC . G06F 2203/04104; G06F 2203/04106; G06F 3/0412; G06F 3/0414; G06F 3/0416; G06F 3/044; G06F 3/0488; G06F 1/1626; G06F 3/011; G06F 9/542; G06F 9/451; H04N 5/2258; G96F 3/04883
See application file for complete search history.

(56) References Cited

U.S. PATENT DOCUMENTS

| | | | | |
|---|---|---|---|---|
| 2007/0239399 | A1* | 10/2007 | Sheynblat | G06F 9/542 702/187 |
| 2008/0284749 | A1* | 11/2008 | Hsu | G06F 1/1626 345/173 |
| 2013/0100076 | A1* | 4/2013 | Tu | H04N 5/2258 345/175 |
| 2013/0159350 | A1* | 6/2013 | Sankar | G06F 3/011 707/784 |

(Continued)

*Primary Examiner* — Richard J Hong
(74) *Attorney, Agent, or Firm* — Sinorica, LLC (57) ABSTRACT

A software defined input operation sensing system, including: at least one input operation sensing device, each having at least two sensing functions; at least one driving unit, used for driving the at least one input operation sensing device according to at least one operation configuration command, each of the at least one operation configuration command including a sensing function selecting instruction for selecting a sensing function from the at least two sensing functions, and/or a sensing spec setting instruction for determining a sensing signal detection mode and a sensed data output format; and at least one processing unit for configuring the at least one driving unit according to an application program to determine at least one content of the at least one operation configuration command, and the at least one processing unit including at least one function library for use in determining the at least one operation configuration command.

14 Claims, 12 Drawing Sheets

(56) References Cited

U.S. PATENT DOCUMENTS

2015/0261416 A1* 9/2015 Thomas .................. G06F 9/451
 715/771
2016/0299959 A1* 10/2016 Sankar .................... G06F 3/011

* cited by examiner

SOFTWARE DEFINED INPUT OPERATION SENSING SYSTEM

BACKGROUND OF THE INVENTION

Field of the Invention

The present invention relates to a software defined input operation sensing system, especially to an input operation sensing system capable of using a software configuration to adaptably provide an input sensing mode required by an application program.

Description of the Related Art

General touch apparatus provides fixed touch detection scheme and fixed touch detection specs after powered on. For example, a capacitive multi-touch screen generally provides same touch detection scheme and same touch detection specs for different application programs. Besides, general capacitive touch product equipped with fingerprint authentication function also provides same touch detection scheme and same touch detection specs, and cannot provide adaptive touch detection scheme or adaptive touch detection specs for different application programs.

To solve the foregoing problems, a novel software defined input operation sensing system is needed.

SUMMARY OF THE INVENTION

One objective of the present invention is to disclose a software defined input operation sensing system, which is capable of providing a software defined function library to support an application program using modularized instructions to configure at least one input sensing interface to meet the requirement of at least one input sensing mode.

Another objective of the present invention is to disclose a software defined input operation sensing system, which is capable of providing at least one sensing specs according to a description of an application program to determine at least one sensing signal detection mode and at least one sensed data output format.

Still another objective of the present invention is to disclose a software defined input operation sensing system, which is capable of providing at least two sensing functions for an application program to select one therefrom, the sensing function can be related to physical quantity, chemical quantity, or biological quantity.

To attain the foregoing objectives, a software defined input operation sensing system is proposed, including:

at least one input operation sensing device, each having a sensing plane of at least one sensing unit, the sensing unit including at least two sensing functions selected from a group consisting of a mechanical force sensing function, a heat sensing function, an optical sensing function, a magnetic field sensing function, an electric field sensing function, a sound waves sensing function, a radiation rays sensing function, a chemical sensing function and a biometric sensing function;

at least one driving unit, used for driving the at least one input operation sensing device according to at least one operation configuration command, the at least one operation configuration command being stored in a memory, each of the at least one operation configuration command including a sensing function selecting instruction for selecting a sensing function from the at least two sensing functions, and/or a sensing spec setting instruction for determining a sensing signal detection mode and a sensed data output format;

at least one processing unit for configuring the at least one driving unit to determine at least one content of the at least one operation configuration command, the at least one processing unit including at least one function library, the at least one function library storing at least one sensing device configuration setting function for determining the at least one operation configuration command; and at least one application program stored in at least one memory for the at least one processing unit to execute, wherein, each of the at least one application program includes at least one sensing device configuration call instruction, and each of the at least one sensing device configuration call instruction corresponds to one of the at least one sensing device configuration setting function, so that when the at least one processing unit is executing the at least one application program, the at least one processing unit will instruct the at least one driving unit to determine at least one content of the at least one operation configuration command according to at least one function of the at least one sensing device configuration setting function that is called by at least one call instruction of the at least one sensing device configuration call instruction, and the at least one driving unit will drive the at least one input operation sensing device to provide at least one input sensing function according to the at least one operation configuration command.

In one embodiment, the input sensing function is selected from a group consisting of multi-touch function, pressure sensing function, hovering sensing function, 3D range sensing function, 2D image sensing function, fingerprint sensing function, palm print sensing function and face feature sensing function.

In one embodiment, the sensing spec setting instruction includes a sensing elements connection instruction for determining a connection status of the at least one sensing unit of one of the at least one input operation sensing device.

In one embodiment, the sensing spec setting instruction includes a scan rule instruction for determining a scan rule of the at least one sensing unit of one of the at least one input operation sensing device, the scan rule being selected from a group consisting of one-dimensional scanning rule, two-dimensional scanning rule, single-layer scanning rule, double-layer scanning rule, tracking scanning rule, GUI position correspondence scanning rule, dynamic frequency scanning rule and dynamic resolution scanning rule.

In one embodiment, the sensing spec setting instruction includes a data format instruction for determining a data format of sensed information derived by one of the at least one input operation sensing device, the data format being selected from a group consisting of a raw sensing data format, a coordinate data format, a vector data format, a biometric data format and a compound data fusion format.

In one embodiment, the input operation sensing device includes a sensor array selected from a group consisting of a capacitive sensing array, a pressure sensing array, an optical sensing array, an ultrasonic sensing array and an electromagnetic induction array.

In one embodiment, the at least one driving unit includes at least one integrated circuit unit capable of receiving external instructions.

In one embodiment, at least one of the at least one input operation sensing device is a touch display device, and the touch display device has an image display procedure and a touch sensing procedure sharing at least one electrode simultaneously or non-simultaneously, or acting on different electrodes simultaneously or non-simultaneously.

In one embodiment, the operation configuration command of one of the at least one driving unit for driving the touch display device includes a dynamic sensing mode instruction, a content of which being used for instructing the driving unit to adaptively determine an operation timing and/or at least one sensing area for a touch sensing procedure to act on the sensing plane according to an image display procedure.

In one embodiment, the function library is used for generating different combinations of the sensing functions and/or sensing specs according to different application programs.

To make it easier for our examiner to understand the objective of the invention, its structure, innovative features, and performance, we use preferred embodiments together with the accompanying drawings for the detailed description of the invention.

DETAILED DESCRIPTION OF THE PREFERRED EMBODIMENTS

Figure 1:
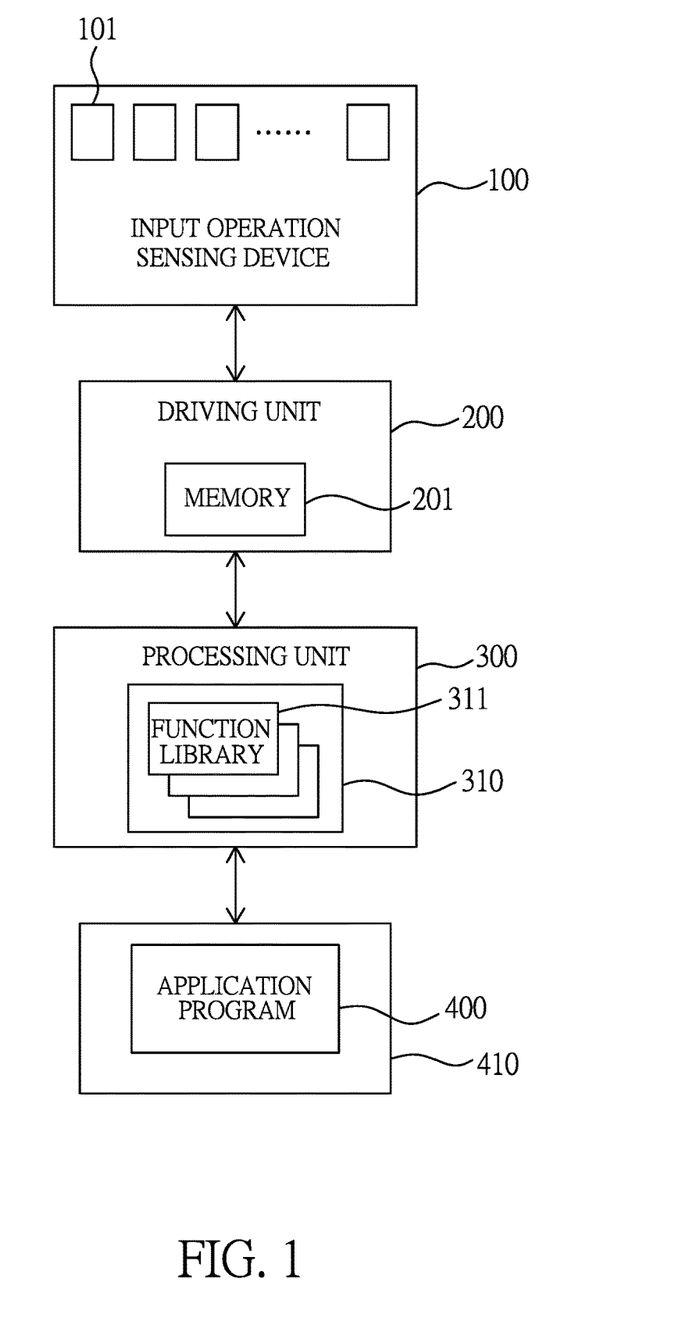
FIG. 1 illustrates a block diagram of a software defined input operation system according to a preferred embodiment of the present invention.

Please refer to FIG. 1, which illustrates a block diagram of a software defined input operation system according to a preferred embodiment of the present invention. As illustrated in FIG. 1, the software defined input operation system includes an input operation sensing device 100, a driving unit 200, a processing unit 300 and an application program 400.

The input operation sensing device 100 has a sensing plane of at least one sensing unit 101, the sensing unit 101 including at least two sensing functions selected from a group consisting of a mechanical force sensing function, a heat sensing function, an optical sensing function, a magnetic field sensing function, an electric field sensing function, a sound waves sensing function, a radiation rays sensing function, a chemical sensing function and a biometric sensing function. For example, the sensing plane can include different sensing arrays, and the sensing array can be selected from a group consisting of a capacitive sensing array, a pressure sensing array, an optical sensing array, an ultrasonic sensing array and an electromagnetic induction array. It is to be noted that although only one input operation sensing device 100 is shown in this embodiment, plural input operation sensing devices can also be used in the present invention.

The driving unit 200 is used for driving the input operation sensing device 100 according to at least one operation configuration command, the at least one operation configuration command being stored in a memory 201, each of the at least one operation configuration command including a sensing function selecting instruction for selecting a sensing function from the at least two sensing functions, and/or a sensing spec setting instruction for determining a sensing signal detection mode and a sensed data output format. It is to be noted that although only one driving unit 200 is shown in this embodiment, plural driving units can also be used in the present invention. That is, the present invention can use one driving unit 200 to drive one or more input operation sensing devices 100, or use plural driving units 200 to drive plural input operation sensing devices 100. Besides, one or more driving units 200 can be implemented by an integrated circuit unit capable of receiving external instructions.

The processing unit 300 is used for configuring the at least one driving unit 200 to determine at least one content of the at least one operation configuration command, where the at least one processing unit has a system program 310 including at least one function library 311 and being stored in a memory (not shown in the figure), the at least one function library 311 storing at least one sensing device configuration setting function for determining the at least one operation configuration command. It is to be noted that although only one processing unit 300 is shown in this embodiment, plural processing units can also be used in the present invention. That is, the present invention can use one processing unit 300 to configure one or more driving units 200, or use plural processing units 300 to configure plural driving units 200.

The application program 400 is stored in a memory 410 for the processing unit 300 to execute, wherein, the application program 400 includes at least one sensing device configuration call instruction, and each of the at least one sensing device configuration call instruction corresponds to one of the at least one sensing device configuration setting function, so that when the processing unit 300 is executing the application program 400, the processing unit 300 will instruct the at least one driving unit 200 to determine at least one content of the at least one operation configuration command according to at least one function of the at least one sensing device configuration setting function that is called by at least one call instruction of the at least one sensing device configuration call instruction, and the at least one driving unit 200 will drive the at least one input operation sensing device 100 to provide at least one input sensing function according to the at least one operation configuration command.

The input sensing function can be multi-touch function, pressure sensing function, hovering sensing function, 3D range sensing function, 2D image sensing function, fingerprint sensing function, palm print sensing function or face feature sensing function.

Besides, the sensing spec setting instruction can include a sensing elements connection instruction for determining a connection status of the at least one sensing unit 101 of one input operation sensing device 100.

Besides, the sensing spec setting instruction can include a scan rule instruction for determining a scan rule of the at least one sensing unit 101 of one input operation sensing device 100, where the scan rule can be one-dimensional scanning rule, two-dimensional scanning rule, single-layer scanning rule, double-layer scanning rule, tracking scanning rule, GUI position correspondence scanning rule, dynamic frequency scanning rule, or dynamic resolution scanning rule.

Besides, the sensing spec setting instruction can include a data format instruction for determining a data format of sensed information derived by one input operation sensing device 100, where the data format can be a raw sensing data format, a coordinate data format, a vector data format, a biometric data format, or a compound data fusion format.

Besides, the input operation sensing device 100 can be a touch display device, and the touch display device has an image display procedure and a touch sensing procedure sharing at least one electrode simultaneously or non-simultaneously, or acting on different electrodes simultaneously or non-simultaneously. When one input operation sensing device 100 is a touch display device, the operation configuration command of one driving unit 200 for driving the touch display device can include a dynamic sensing mode instruction, where a content of the dynamic sensing mode instruction is used for instructing the driving unit to adaptively determine an operation timing and/or at least one sensing area for the touch sensing procedure to act on the sensing plane according to the image display procedure.

Besides, the sensed data derived by the input operation sensing device 100 can be processed by the processing unit 300 and then delivered to the application program 400.

Based on the schemes disclosed above, the present invention can therefore utilize the function library 311 to support different application programs 400 to generate different combinations of the sensing functions and/or sensing specs according to different requirements of the different application programs.

Figure 2:
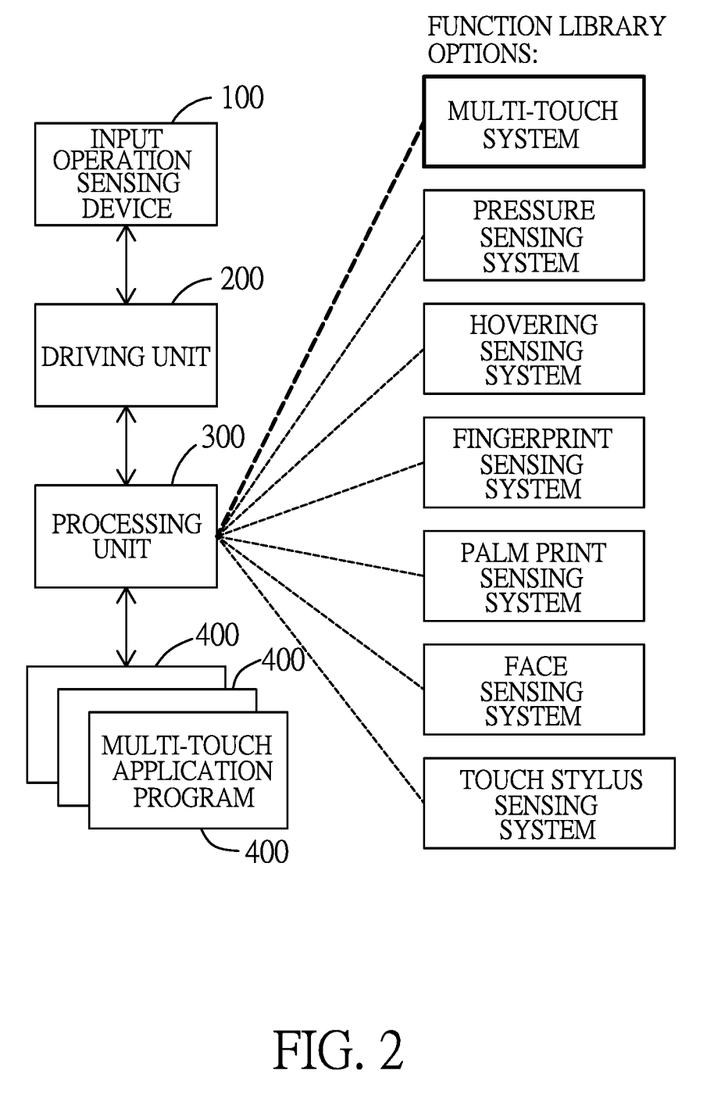
FIG. 2 illustrates a block diagram of an application of the software defined input operation system of the present invention.

Please refer to FIG. 2, which illustrates a block diagram of an application of the software defined input operation system of the present invention. As illustrated in FIG. 2, the application program 400 is a multi-touch application program. When the processing unit 300 executes the multi-touch application program, the processing unit 300 will select a multi-touch configuration setting function among a plurality of function options in the at least one function library 311, and instruct a driving unit 200 to set at least one content of the at least one operation configuration command according to a content of the multi-touch configuration setting function, so that the driving unit 200 can drive an input operation sensing device 100 according to the at least one operation configuration command to provide a multi-touch input sensing function.

Figure 3:
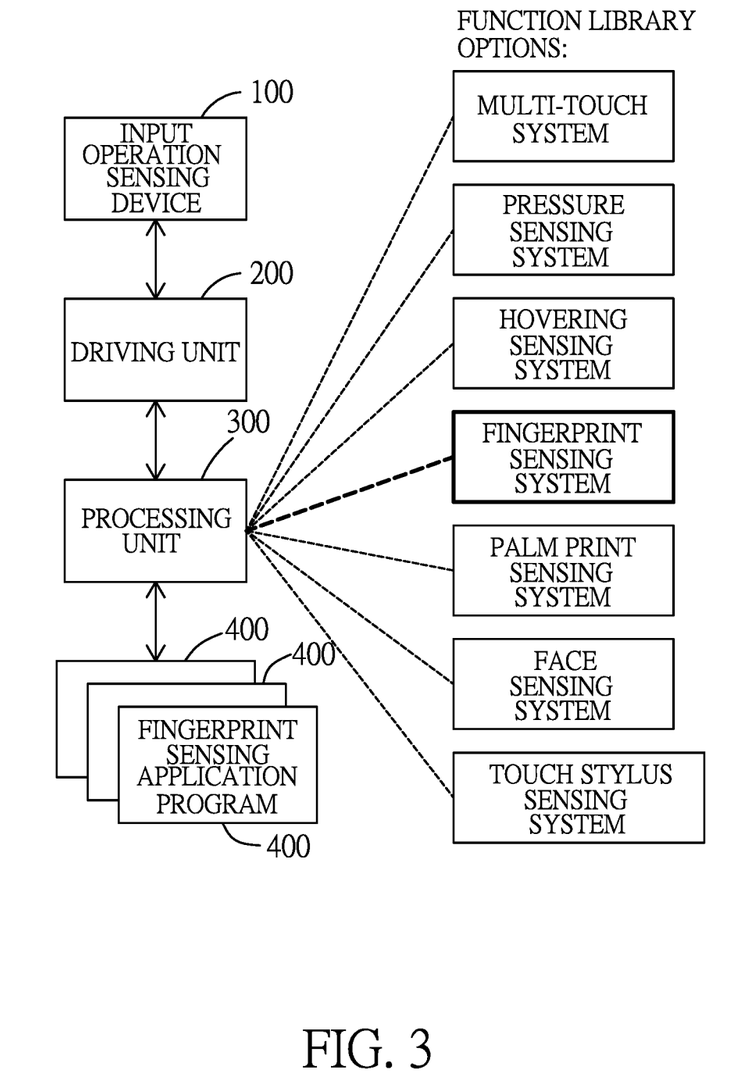
FIG. 3 illustrates a block diagram of another application of the software defined input operation system of the present invention.

Please refer to FIG. 3, which illustrates a block diagram of another application of the software defined input operation system of the present invention. As illustrated in FIG. 3, the application program 400 is a fingerprint sensing application program. When the processing unit 300 executes the fingerprint sensing application program, the processing unit 300 will select a fingerprint sensing configuration setting function among a plurality of function options in the at least one function library 311, and instruct a driving unit 200 to set at least one content of the at least one operation configuration command according to a content of the fingerprint sensing configuration setting function, so that the driving unit 200 can drive an input operation sensing device 100 according to the at least one operation configuration command to provide a fingerprint sensing function.

Figure 4:
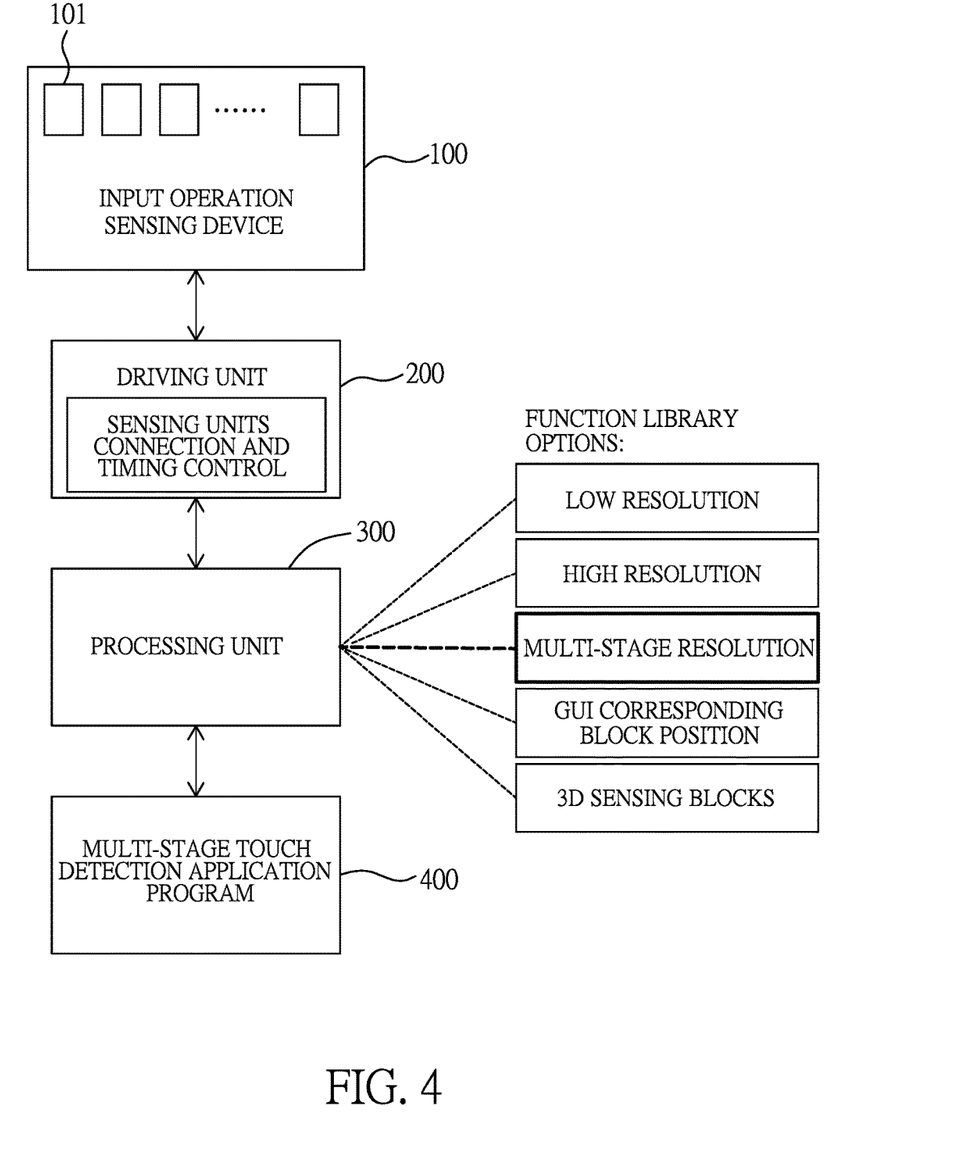
FIG. 4 illustrates a block diagram of another application of the software defined input operation system of the present invention.

Please refer to FIG. 4, which illustrates a block diagram of another application of the software defined input operation system of the present invention. As illustrated in FIG. 4, the application program 400 is a multi-stage touch detection application program. When the processing unit 300 executes the multi-stage touch detection application program, the processing unit 300 will select a multi-stage touch configuration setting function among a plurality of function options in the at least one function library 311, and instruct a driving unit 200 to set at least one content of the at least one operation configuration command according to a content of the multi-stage touch configuration setting function, so that the driving unit 200 can drive an input operation sensing device 100 according to the at least one operation configuration command to perform a sensing units connection operation and/or a timing setting operation, to make the at least one sensing unit 101 have different connection configurations at different stages, and thereby provide a multi-stage touch detection function.

Figure 5:
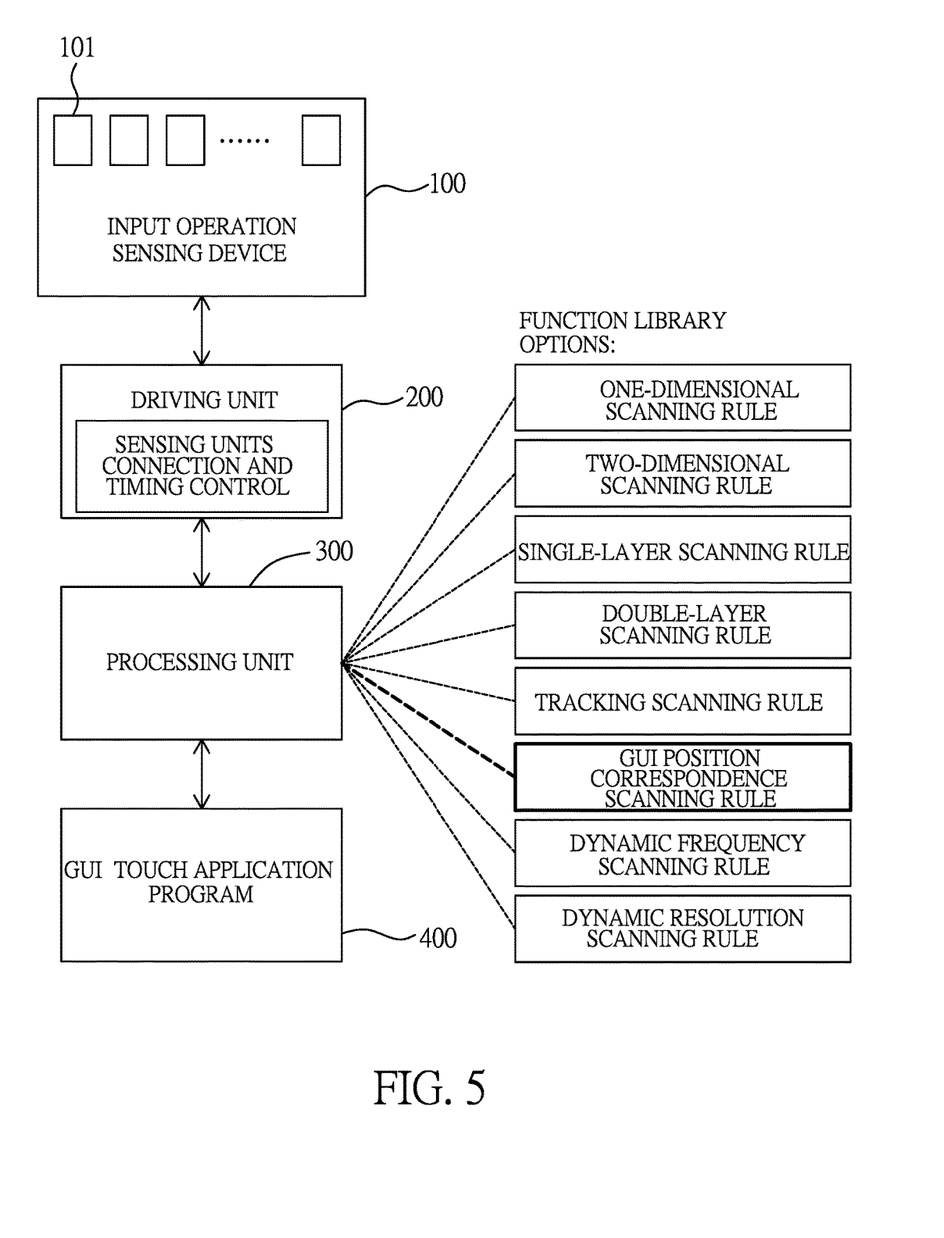
FIG. 5 illustrates a block diagram of another application of the software defined input operation system of the present invention.

Please refer to FIG. 5, which illustrates a block diagram of another application of the software defined input operation system of the present invention. As illustrated in FIG. 5, the application program 400 is a GUI (graphic user interface) touch application program. When the processing unit 300 executes the GUI touch application program, the processing unit 300 will select a GUI touch configuration setting function among a plurality of function options in the at least one function library 311, and instruct a driving unit 200 to set at least one content of the at least one operation configuration command according to a content of the GUI touch configuration setting function, so that the driving unit 200 can drive an input operation sensing device 100 according to the at least one operation configuration command to perform a sensing units connection operation and/or a timing setting operation, to select a corresponding detection block in the sensing plane, and thereby provide a GUI touch detection function.

Figure 6:
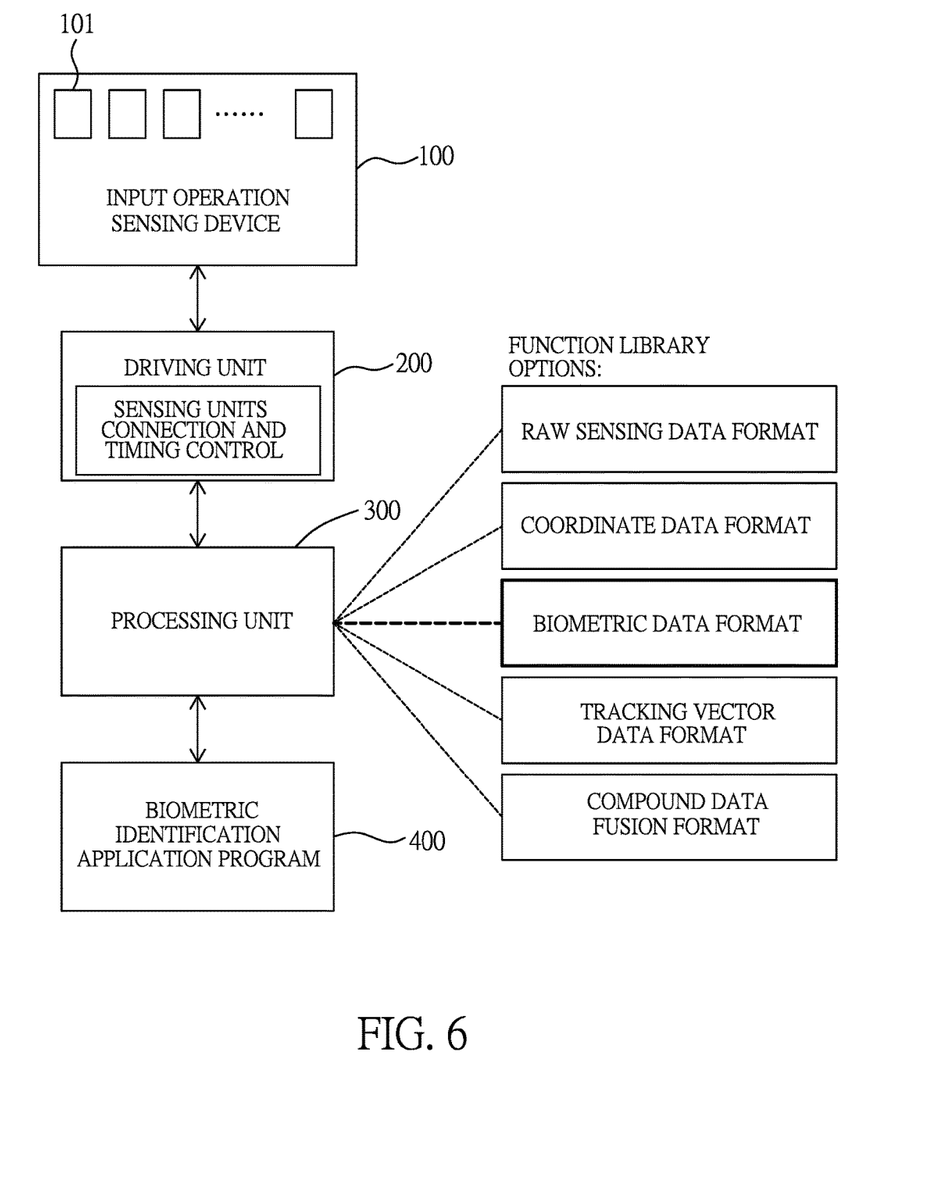
FIG. 6 illustrates a block diagram of another application of the software defined input operation system of the present invention.

Please refer to FIG. 6, which illustrates a block diagram of another application of the software defined input operation system of the present invention. As illustrated in FIG. 6, the application program 400 is a biometric identification application program. When the processing unit 300 executes the biometric identification application program, the processing unit 300 will select a data format configuration setting function among a plurality of function options in the at least one function library 311, and instruct a driving unit 200 to set at least one content of the at least one operation configuration command according to a content of the data format configuration setting function, so that the driving unit 200 can drive an input operation sensing device 100 according to the at least one operation configuration command to perform an output data format setting operation and/or a sensing units connecting operation to determine the data format of the sensed information obtained by the input operation sensing device 100, and thereby provide a biometric identification function.

Figure 7:
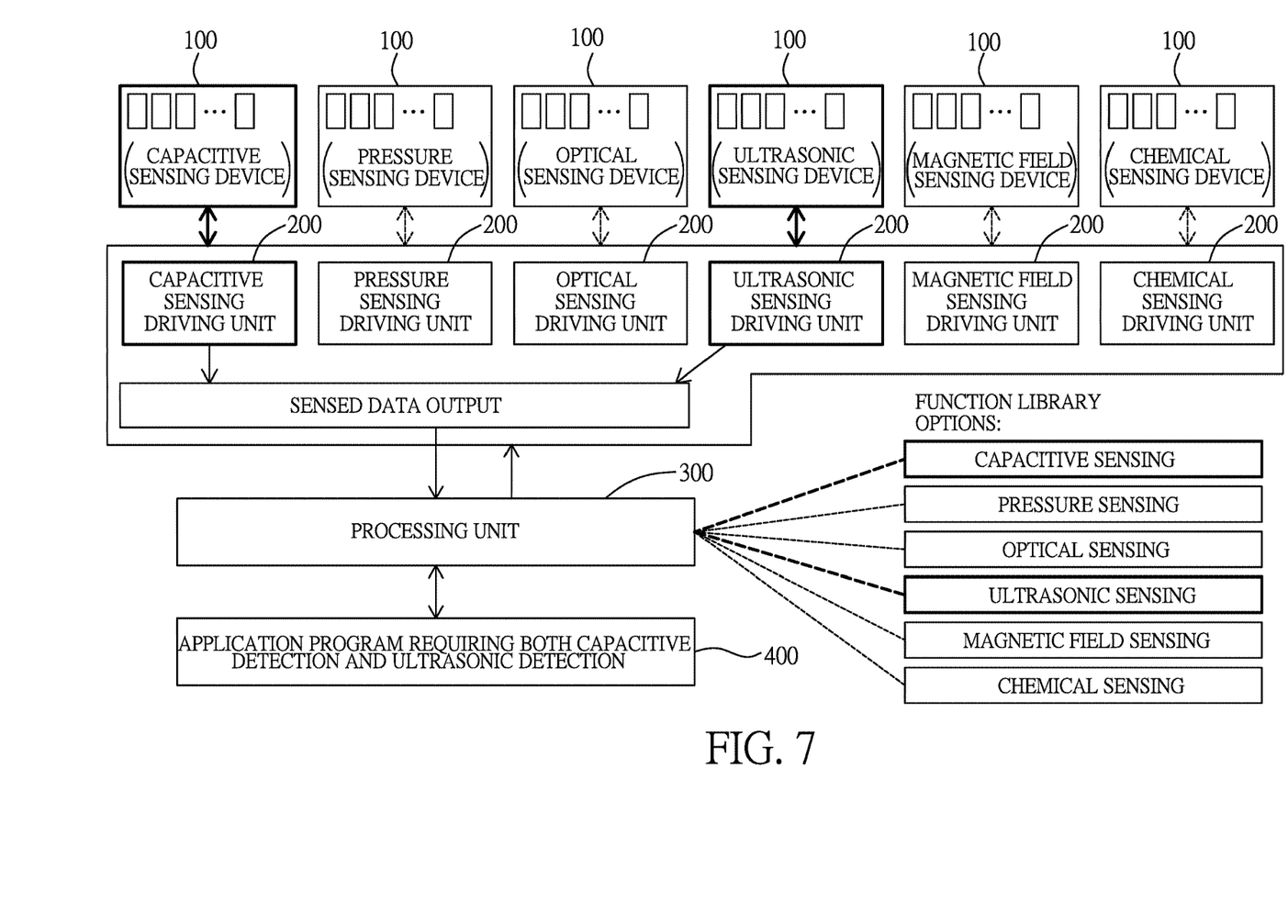
FIG. 7 illustrates a block diagram of another application of the software defined input operation system of the present invention.

Please refer to FIG. 7, which illustrates a block diagram of another application of the software defined input operation system of the present invention. As illustrated in FIG. 7, the application program 400 is an application program requiring both capacitive detection and ultrasonic detection. When the processing unit 300 executes the program, the processing unit 300 will select a capacitive detection configuration setting function and an ultrasonic detection configuration setting function from a plurality of function options in the at least one function library 311, and instruct two driving units 200 according to the contents of the capacitive detection configuration setting function and the ultrasonic detection configuration setting function to set the content of the at least one operation configuration command, so that the two driving units 200 can drive the two input operation sensing devices 100 (respectively a capacitive sensing array and an ultrasonic sensing array) to provide a touch detection function featuring both capacitive detection and ultrasonic detection.

Figure 8:
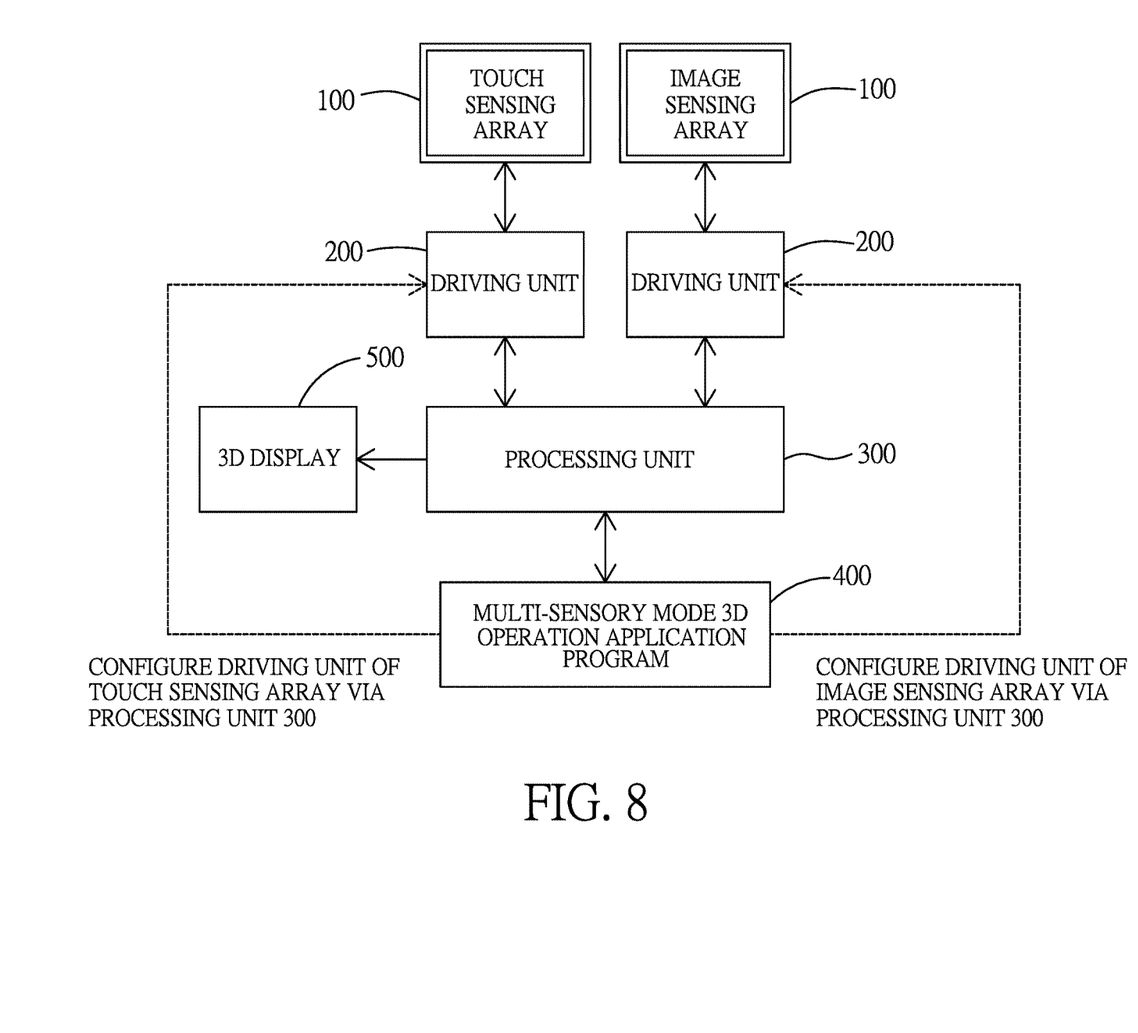
FIG. 8 illustrates a block diagram of another application of the software defined input operation system of the present invention.

Please refer to FIG. 8, which illustrates a block diagram of another application of the software defined input operation system of the present invention. As illustrated in FIG. 8, the application program 400 is a multi-sensory mode 3D operation application program. When the processing unit 300 executes the program, the processing unit 300 will instruct two driving units 200 respectively to set the content of the at least one operation configuration command according to the content of the sensing device configuration setting function that is called, so that the two driving units 200 can respectively follow the at least one operation configuration command thereof to drive two input operation sensing device 100 (respectively a touch sensing array and an image sensing array) to provide a 3D operation detection function with multiple sensing modes in a display environment of a 3D display 500, wherein the multiple sensing modes include an actual pressing operation, a hovering operation and a somatosensory operation.

Figure 9:
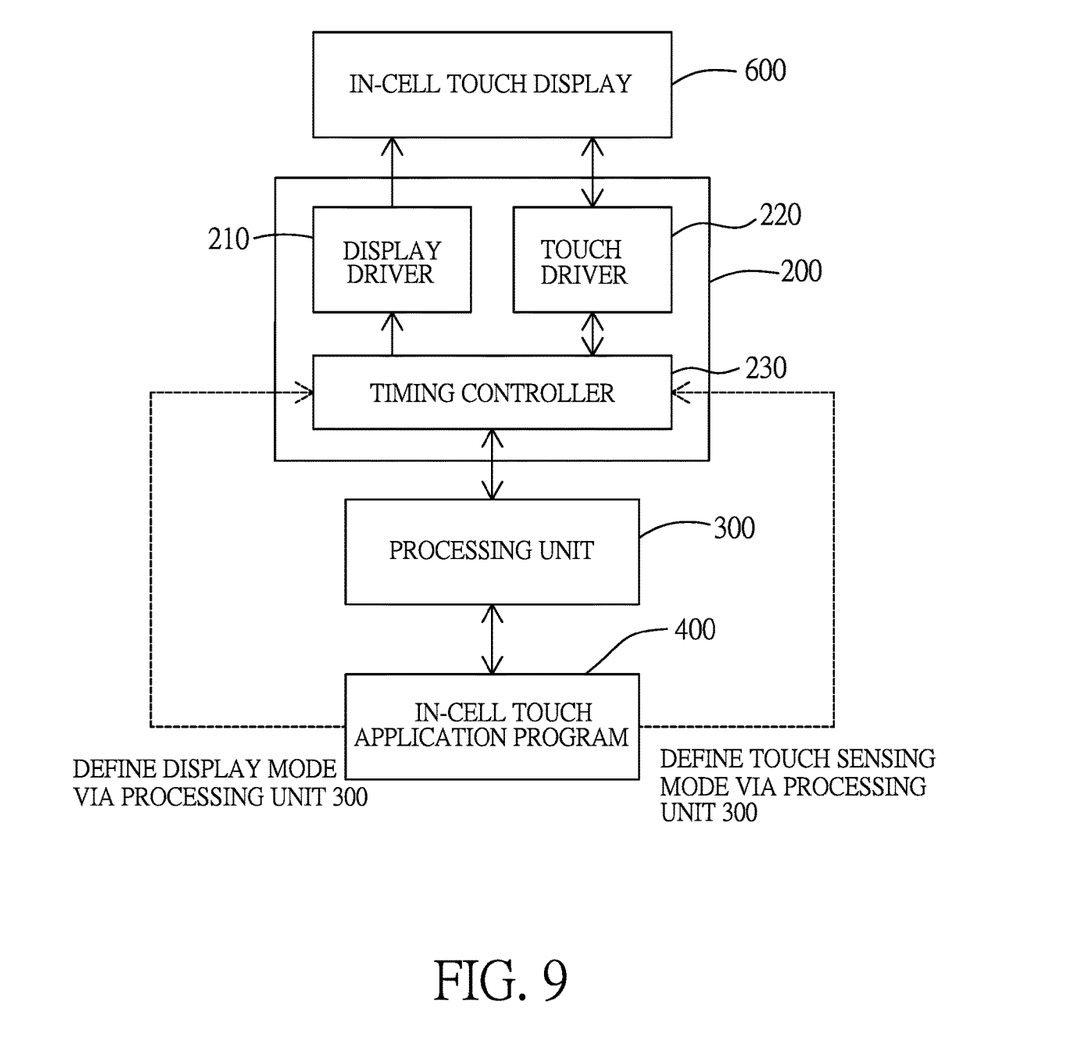
FIG. 9 illustrates a block diagram of another application of the software defined input operation system of the present invention.
Figure 10A:
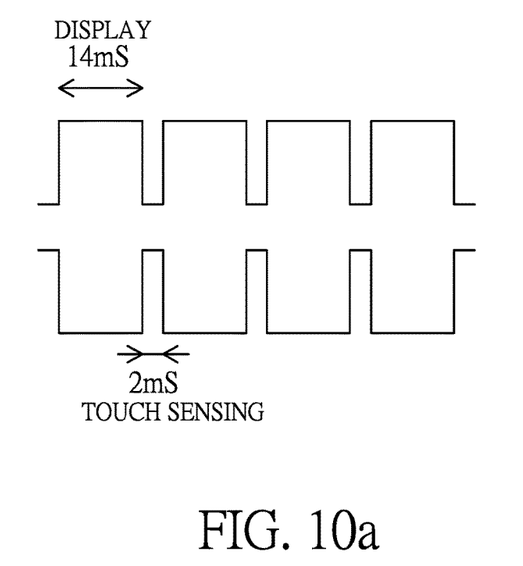
FIG. 10a and FIG. 10b illustrate respectively an operation timing diagram for a display procedure and a touch sensing procedure of the application shown in FIG. 9 when a motion picture is played, and an operation timing diagram for a display procedure and a touch sensing procedure of the application shown in FIG. 9 when a static image is played.
Figure 10B:
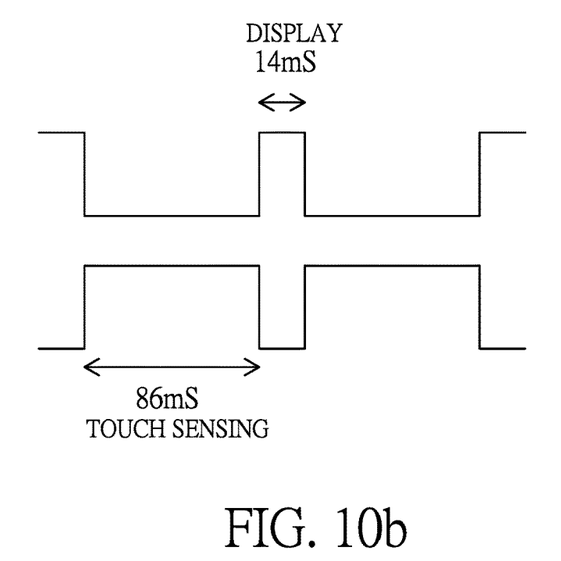

Please refer to FIG. 9, which illustrates a block diagram of another application of the software defined input operation system of the present invention. As illustrated in FIG. 9, the application program 400 is an in-cell touch application program. When the processing unit 300 executes the in-cell touch application program, the processing unit 300 will instruct a timing controller 230 in the driving unit 200 according to the content of the sensing device configuration setting function that is called to drive a display driver 210 and a touch driver 220, such that the at least one driving unit 200 will drive an in-cell touch display 600 according to the at least one operation configuration command, so as to provide a touch panel capable of determining an adaptive operation timing for a display procedure and a touch detection procedure according to the command of an application program. For example, please refer to FIG. 10a and FIG. 10b, which illustrate respectively an operation timing diagram for a display procedure and a touch sensing procedure of the application shown in FIG. 9 when a motion picture is played, and an operation timing diagram for a display procedure and a touch sensing procedure of the application shown in FIG. 9 when a static image is played.

Figure 11A:
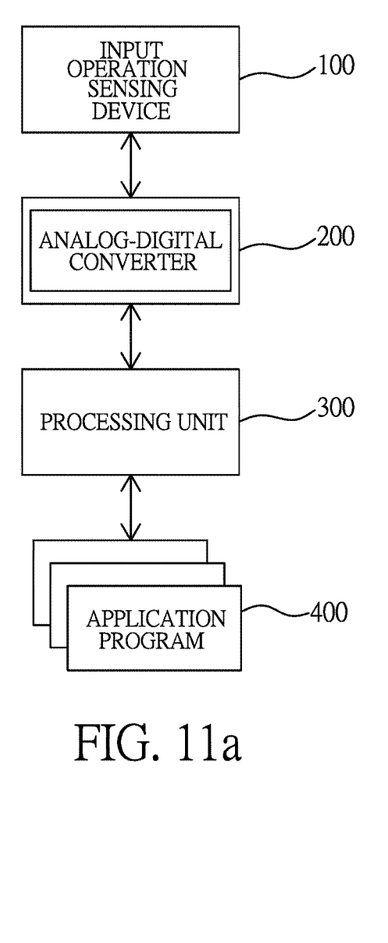
FIG. 11a-11c illustrate block diagrams of three possible embodiments of the software defined input operation sensing system of the present invention.
Figure 11B:
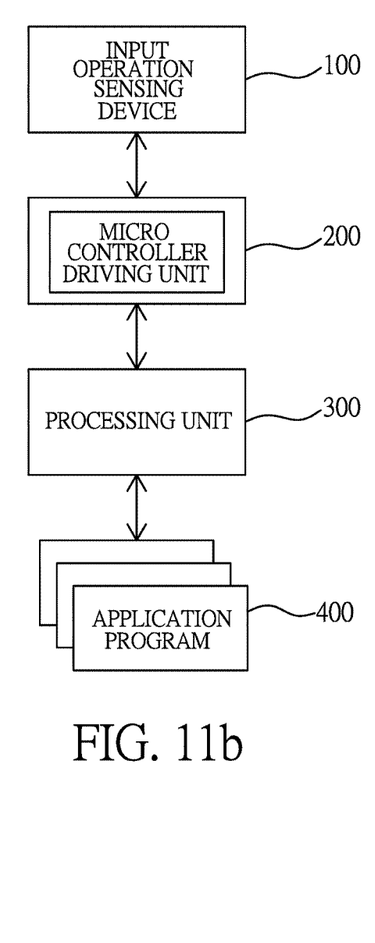
Figure 11C:
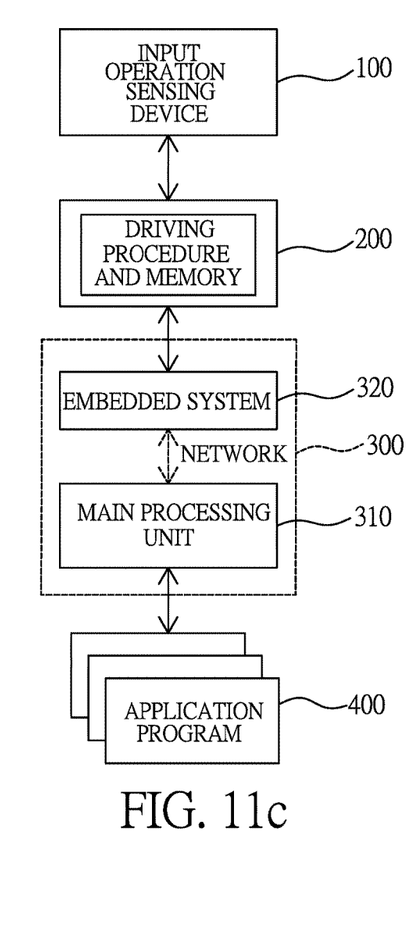

Besides, please refer to FIG. 11a-11c, which illustrate block diagrams of three possible embodiments of the software defined input operation sensing system of the present invention. In FIG. 11a, the driving unit 200 is an ADC (analog-digital converter) driving unit; in FIG. 11b, the driving unit 200 is a micro controller driving unit; and in FIG. 11c, the driving unit 200 includes a main processing unit 320 and an embedded system 330, where the main processing unit 320 and the embedded system 330 communicate with each other via a network.

Figure 12A:
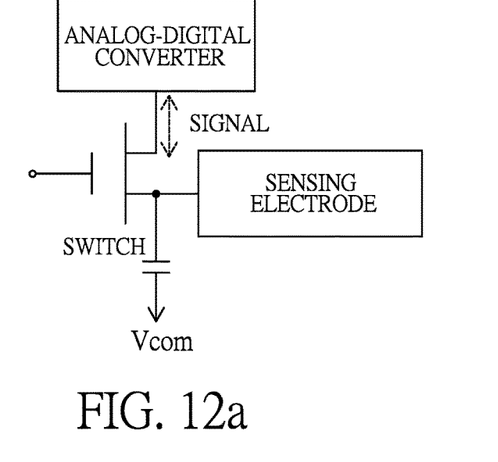
FIG. 12a-12c illustrate three circuit structures used in the software defined input operation sensing system of the present invention, where a transistor switch or an amplifier circuit is controlled according to instructions of a software program to receive a response signal of a sensor unit or of a sensing electrode.
Figure 12B:
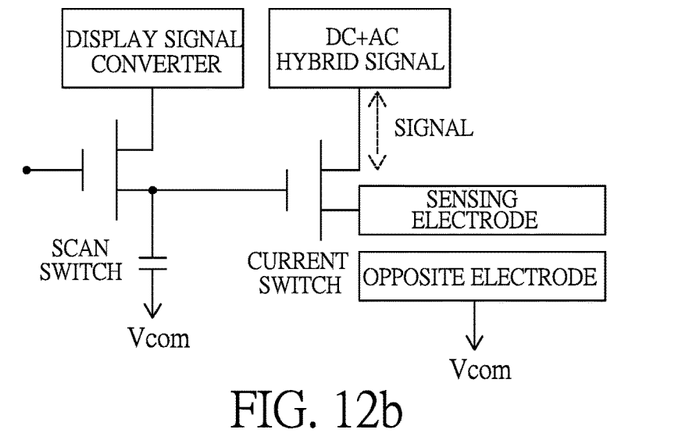
Figure 12C:
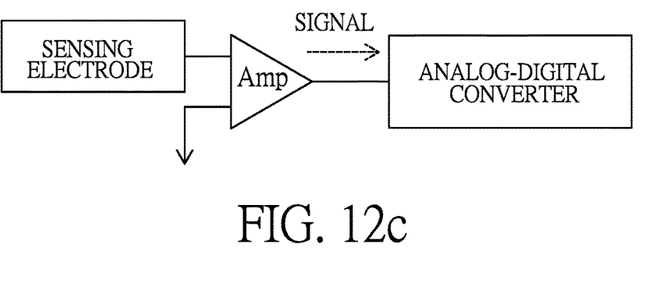

Besides, in the software defined input operation sensing system of the present invention, a transistor switch circuit or an amplifier circuit can be controlled by a software program to receive a response signal of a sensing unit or a sensing electrode. Please refer to FIG. 12a-12c, which illustrate three circuit structures used in the software defined input operation sensing system of the present invention, where a transistor switch or an amplifier circuit is controlled according to instructions of a software program to receive a response signal of a sensor unit or of a sensing electrode.

Thanks to the foregoing schemes, the present invention possesses the advantages as follows:

1. The software defined input operation sensing system of the present invention can provide a software defined function library to support an application program using modularized instructions to configure at least one input sensing interface to meet the requirement of at least one input sensing mode.

2. The software defined input operation sensing system of the present invention can provide at least one sensing specs according to a description of an application program to determine at least one sensing signal detection mode and at least one sensed data output format.

3. The software defined input operation sensing system of the present invention can provide at least two sensing functions for an application program to select one therefrom, the sensing function can be related to physical quantity, chemical quantity, or biological quantity.

While the invention has been described by way of example and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance over the conventional structure and further complies with the patent application requirements and is submitted to the Patent and Trademark Office for review and granting of the commensurate patent rights.

What is claimed is:

1. A software defined input operation sensing system, including:
    at least one input operation sensing device, each having a sensing plane of at least one sensing unit, the sensing unit including at least two sensing functions selected from a group consisting of a mechanical force sensing function, a heat sensing function, an optical sensing function, a magnetic field sensing function, an electric field sensing function, a sound waves sensing function, a radiation rays sensing function, a chemical sensing function and a biometric sensing function;
    at least one driving unit, used for driving the at least one input operation sensing device according to at least one operation configuration command, the at least one operation configuration command being stored in a memory, each of the at least one operation configuration command including a sensing function selecting instruction for selecting a sensing function from the at least two sensing functions, and/or a sensing spec setting instruction for determining a sensing signal detection mode and a sensed data output format;

at least one processing unit for configuring the at least one driving unit to determine at least one content of the at least one operation configuration command, the at least one processing unit including at least one function library, the at least one function library storing at least one sensing device configuration setting function for determining the at least one operation configuration command; and at least one application program stored in at least one memory for the at least one processing unit to execute, wherein, each of the at least one application program includes at least one sensing device configuration call instruction, and each of the at least one sensing device configuration call instruction corresponds to one of the at least one sensing device configuration setting function, so that after the at least one processing unit executes the at least one application program, the at least one processing unit will instruct the at least one driving unit to determine at least one content of the at least one operation configuration command according to at least one function of the at least one sensing device configuration setting function that is called by at least one call instruction of the at least one sensing device configuration call instruction, and the at least one driving unit will drive the at least one input operation sensing device to provide at least one input sensing function according to the at least one operation configuration command, and wherein the sensing function or sensing spec or both the sensing function and sensing spec are selectable according to the application program, and wherein the sensing spec setting instruction includes a scan rule instruction for determining a scan rule of the at least one sensing unit of one of the at least one input operation sensing device, the scan rule being selected from a group consisting of tracking scanning rule, GUI position correspondence scanning rule, dynamic frequency scanning rule and dynamic resolution scanning rule.

2. The software defined input operation sensing system as disclosed in claim 1, wherein the input sensing function is selected from a group consisting of multi-touch function, pressure sensing function, hovering sensing function, 3D range sensing function, 2D image sensing function, fingerprint sensing function, palm print sensing function and face feature sensing function.

3. The software defined input operation sensing system as disclosed in claim 1, wherein the sensing spec setting instruction includes a sensing elements connection instruction for determining a connection status of the at least one sensing unit of one of the at least one input operation sensing device.

4. The software defined input operation sensing system as disclosed in claim 1, wherein the sensing spec setting instruction includes a data format instruction for determining a data format of sensed information derived by one of the at least one input operation sensing device, the data format being selected from a group consisting of a raw sensing data format, a coordinate data format, a vector data format, a biometric data format and a compound data fusion format.

5. The software defined input operation sensing system as disclosed in claim 1, wherein the input operation sensing device includes a sensor array selected from a group consisting of a capacitive sensing array, a pressure sensing array, an optical sensing array, an ultrasonic sensing array and an electromagnetic induction array.

6. The software defined input operation sensing system as disclosed in claim 1, wherein the at least one driving unit includes at least one integrated circuit unit capable of receiving external instructions.

7. The software defined input operation sensing system as disclosed in claim 1, wherein at least one of the at least one input operation sensing device is a touch display device, and the touch display device has an image display procedure and a touch sensing procedure sharing at least one electrode simultaneously or non-simultaneously, or acting on different electrodes simultaneously or non-simultaneously.

8. The software defined input operation sensing system as disclosed in claim 7, wherein the operation configuration command of one of the at least one driving unit for driving the touch display device includes a dynamic sensing mode instruction, a content of which being used for instructing the driving unit to adaptively determine an operation timing and/or at least one sensing area for a touch sensing procedure to act on the sensing plane according to an image display procedure.

9. The software defined input operation sensing system as disclosed in claim 1, wherein the function library is used for generating different combinations of the sensing functions and/or sensing specs according to different application programs.

10. The software defined input operation sensing system as disclosed in claim 1, wherein the application program is a multi-stage touch detection application program, and after the processing unit executes the multi-stage touch detection application program, the processing unit will select a multi-stage touch configuration setting function among a plurality of function options in the at least one function library, and instruct a driving unit to set at least one content of the at least one operation configuration command according to a content of the multi-stage touch configuration setting function, so that the driving unit can drive an input operation sensing device according to the at least one operation configuration command to perform a sensing units connection operation and a timing setting operation, to make the at least one sensing unit have different connection configurations at different stages, and thereby provide a multi-stage touch detection function.

11. The software defined input operation sensing system as disclosed in claim 1, wherein the application program is a GUI (graphic user interface) touch application program, and after the processing unit executes the GUI touch application program, the processing unit will select a GUI touch configuration setting function among a plurality of function options in the at least one function library, and instruct a driving unit to set at least one content of the at least one operation configuration command according to a content of the GUI touch configuration setting function, so that the driving unit can drive an input operation sensing device according to the at least one operation configuration command to perform a sensing units connection operation and a timing setting operation, to select a corresponding detection block in the sensing plane, and thereby provide a GUI touch detection function.

12. The software defined input operation sensing system as disclosed in claim 1, wherein the application program is an application program requiring both capacitive detection and ultrasonic detection, and after the processing unit executes the program, the processing unit will select a capacitive detection configuration setting function and an ultrasonic detection configuration setting function from a plurality of function options in the at least one function library, and instruct two driving units according to the contents of the capacitive detection configuration setting function and the ultrasonic detection configuration setting function to set the content of the at least one operation configuration command, so that the two driving units can drive the two input operation sensing devices to provide a touch detection function featuring both capacitive detection and ultrasonic detection.

13. The software defined input operation sensing system as disclosed in claim 1, wherein the application program is an in-cell touch application program, and after the processing unit executes the in-cell touch application program, the processing unit will instruct a timing controller in the driving unit according to the content of the sensing device configuration setting function that is called to drive a display driver and a touch driver, such that the at least one driving unit will drive an in-cell touch display according to the at least one operation configuration command, so as to provide a touch panel capable of determining an adaptive operation timing for a display procedure and a touch detection procedure according to the command of an application program.

14. The software defined input operation sensing system as disclosed in claim 1, wherein a transistor switch or an amplifier circuit is controlled according to instructions of the application program to receive a response signal of a sensor unit or a sensing electrode.

\* \* \* \* \*